E. H. ALVORD.

AUTOMATIC FILTER PRESS.

APPLICATION FILED AUG. 23, 1909.

Reissued Jan. 9, 1912.

13,351.

4 SHEETS—SHEET 1.

Witnesses

Alex Currie

Roger Henry.

Inventor

E. H. Alvord

By Adams & Brooks

Attorneys

E. H. ALVORD.

AUTOMATIC FILTER PRESS.

APPLICATION FILED AUG. 23, 1909.

Reissued Jan. 9, 1912.

13,351.

4 SHEETS—SHEET 2.

Witnesses

Alex Currie

Roger Hovey

Inventor

E. H. Alvord

By Adams & Brooks

Attorneys

E. H. ALVORD.

AUTOMATIC FILTER PRESS.

APPLICATION FILED AUG. 28, 1909.

Reissued Jan. 9, 1912.

13,351.

4 SHEETS—SHEET 3.

Witnesses

Alex Cunnie.

Roger Hovey.

Inventor

E. H. Alvord

By Adams & Brooks

Attorneys

E. H. ALVORD.
AUTOMATIC FILTER PRESS.
APPLICATION FILED AUG. 23, 1909.
Reissued Jan. 9, 1912.
13,351.
4 SHEETS—SHEET 4.
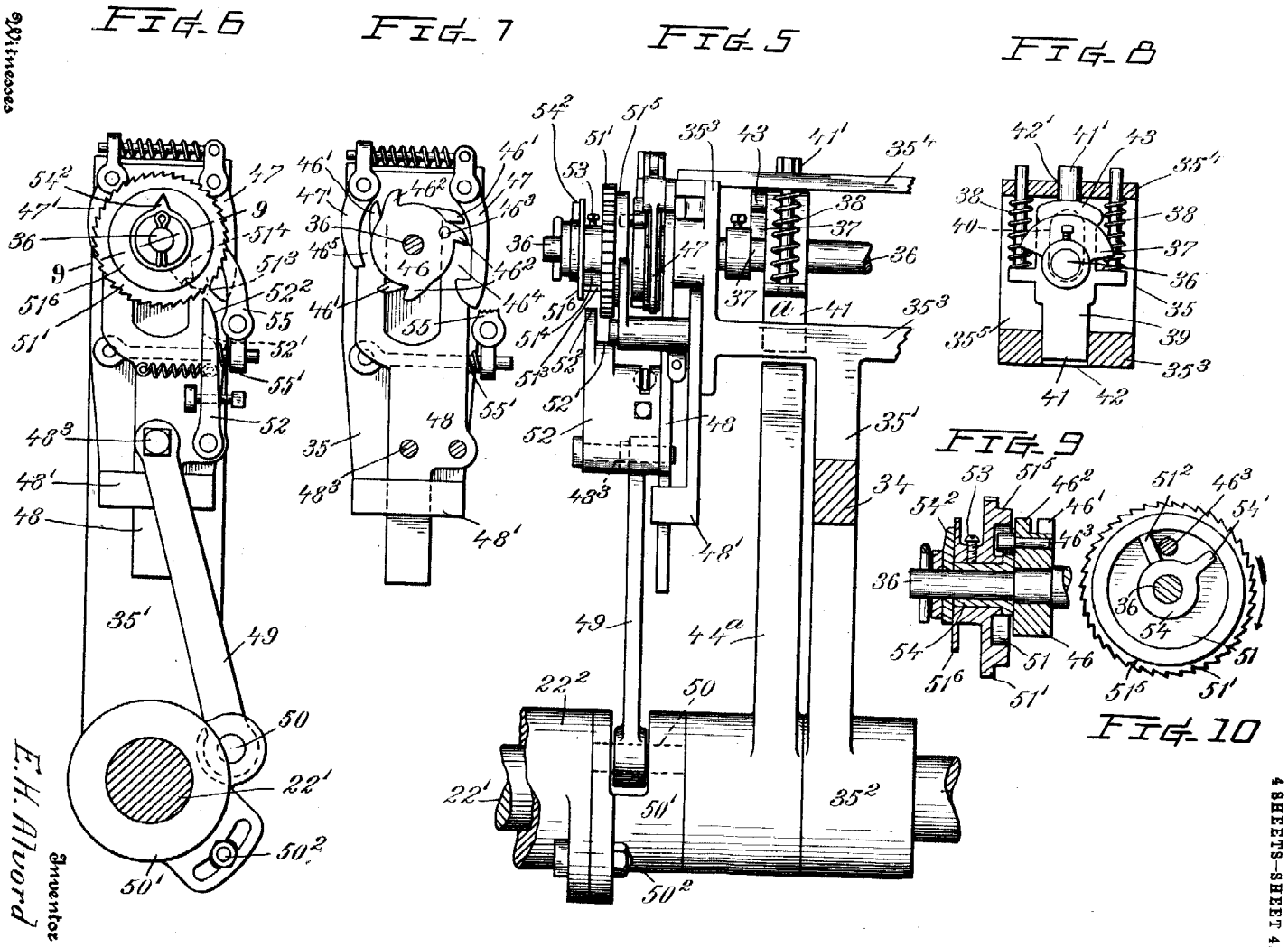
Witnesses
Alex Guerre
Roger Hovey.
Inventor
E. H. Alvord
By Adams & Brooks
Attorneys

UNITED STATES PATENT OFFICE.

ELISHA HENRY ALVORD, OF SEATTLE, WASHINGTON, ASSIGNOR TO HERSCHEL H. TABER, OF TACOMA, WASHINGTON.

AUTOMATIC FILTER-PRESS.

13,351. Specification of Reissued Letters Patent. Reissued Jan. 9, 1912.

Original No. 894,966, dated August 4, 1908, Serial No. 385,343. Application for reissue filed August 23, 1909. Serial No. 514,324.

*To all whom it may concern:*

Be it known that I, ELISHA HENRY ALVORD, a citizen of the United States of America, and a resident of the city of Seattle, in the county of King and State of Washington, have invented certain new and useful Improvements in Automatic Filter-Presses, of which the following is a specification.

The object of this invention is the provision of a filter-press which is operated by power and rendered automatic in the performance of its several actions.

With these ends in view the invention consists in apparatus embodying a cylinder which is reciprocally mounted in a frame having an end which upon occasion serves as the cylinder-head; in power driven mechanism for effecting such reciprocating movements to the cylinder; a plunger for the cylinder and which is arranged to be operated in its compression strokes by suitable power means, while its opposite strokes are accomplished through the corresponding return strokes of the cylinder: a feed supply and devices for controlling the same whereby the charge to be treated is regulated as to time of occurrence and quantity; means for ejecting the residue of the material after being filtered; and in appliances whereby the offices of the above mentioned agencies are adjustably regulated to predeterminately control their respective actions.

The invention further consists in the novel construction, adaptation and combination of parts, as will be hereinafter described and claimed.

Figure 1:
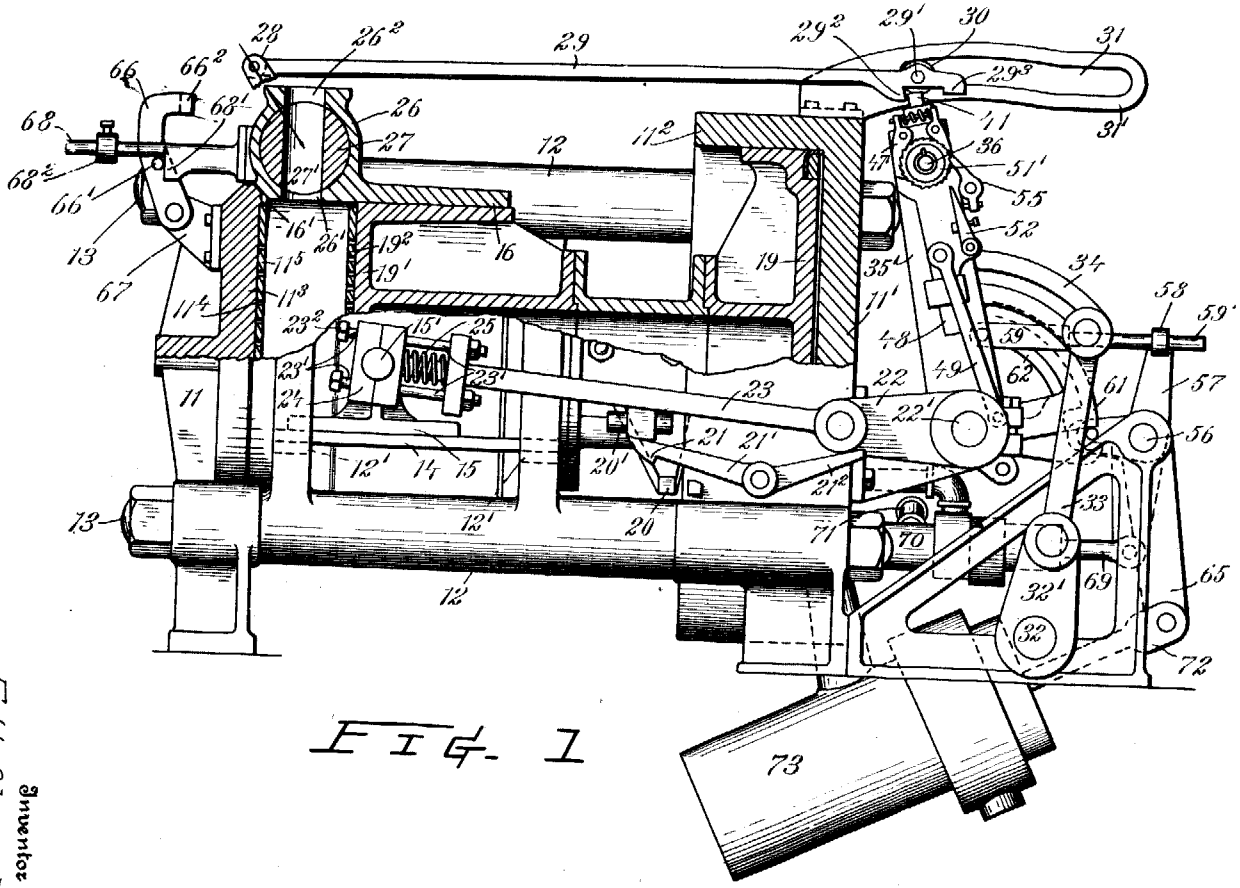
Figure 2:
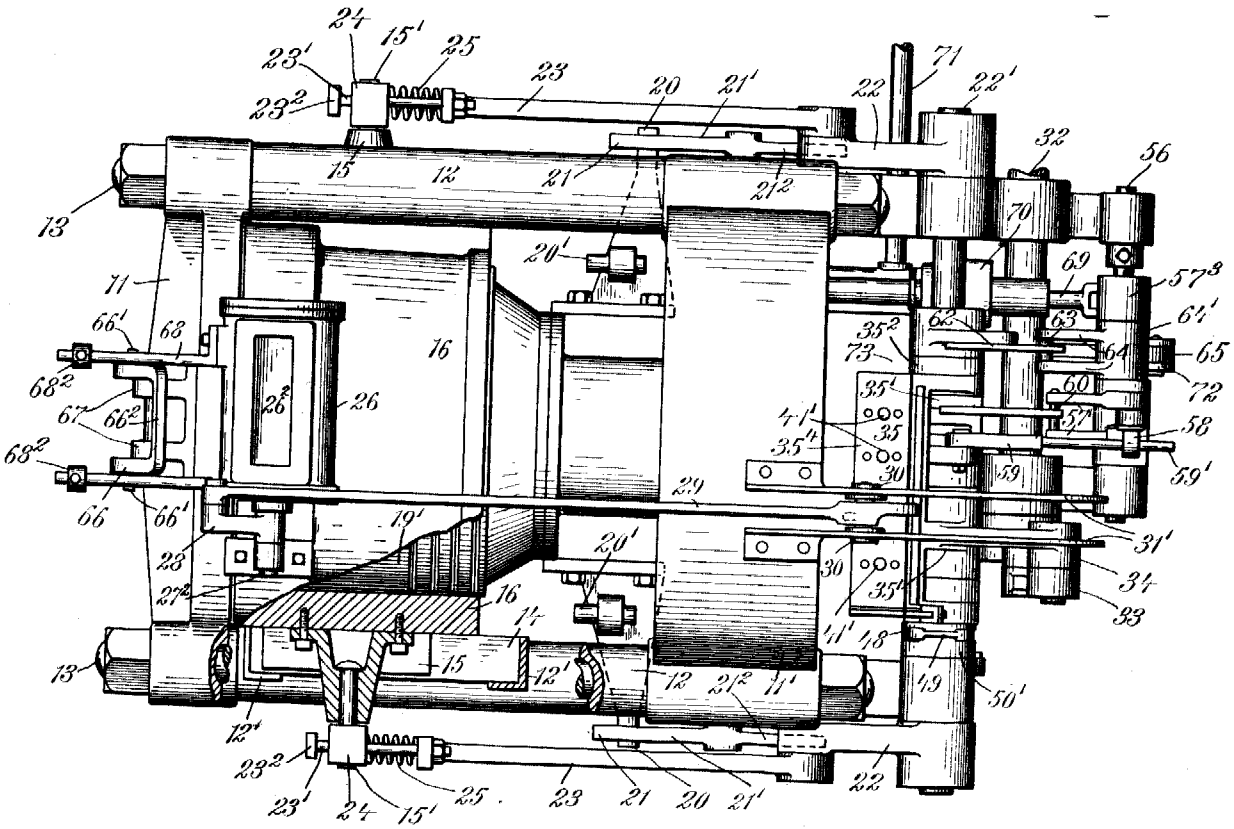
Figure 3:
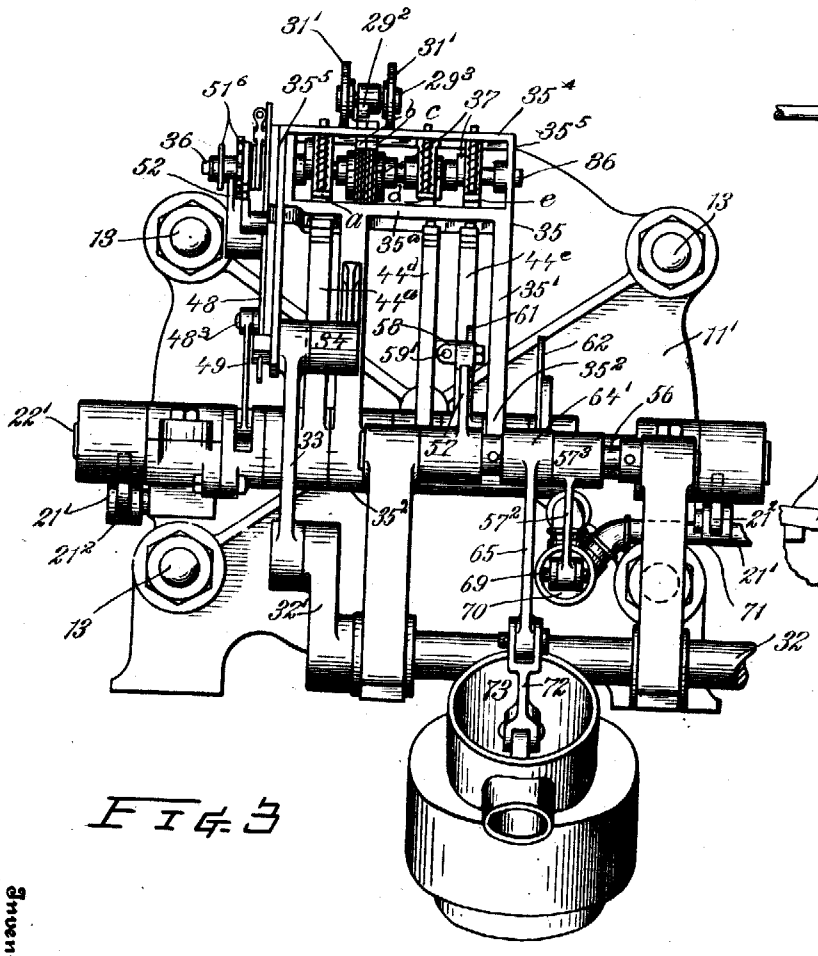

In the drawings Figure 1 is a side elevation, partly in section, showing an embodiment of the invention. Fig. 2, is a plan view of the same with parts broken away. Fig. 3, is a rear end elevation, and Fig. 4, a side elevation of certain of the machine controlling devices employed and illustrated in different positions from that shown in Fig. 1. Fig. 5 is a fragmentary front elevation of the vibrating member together with the associated operating parts. Fig. 6, an end elevation of Fig. 5. Fig. 7, a like view to Fig. 6 with parts thereof omitted. Fig. 8, a section through Fig. 5. Fig. 9, a section taken through 9—9 of Fig. 6 but including only such parts thereof as effect the periodic actions of the machine's operations, and Fig. 10, a section through Fig. 9.

The reference numerals 11 and 11′ respectively represent the front and rear end members of the machine frame and which are rigidly secured at a suitable distance apart by intervening side members 12 and the tie-bolts 13. Formed or provided upon the inner sides of the side members are brackets 12′ for the support of wearing-strips 14 which serve as slipper-ways for blocks 15 fixedly attached to and carrying cylinder 16, which will be hereinafter designated as the compression cylinder. This cylinder, see Fig. 1, is open at both ends and at the front end is interiorly chamfered, as at 16′, to interfit, when in juxtaposition, with the correspondingly chamfered periphery of a front head $11^3$ which is fixedly secured to or formed integral with the front end 11 of the frame.

Projecting forwardly from the frame end 11′ is an annular extension $11^2$ to form the rear head and circumferential wall of the power cylinder which, in the illustrated embodiment, is designed to be operated by water under pressure. Positioned within this cylinder is a piston 19 rigidly connected to, or formed integral with, a plunger 19′ which extends within said compression cylinder and carries laterally protruding lugs 20 having adjustable studs 20′ which are impinged by the cylinder 16 in its rearward movements. These lugs are also adapted to be engaged by the hooked ends 21 of tiltable lever 21′ when the piston has been moved to the end of its rearward travel and, being thus locked, the cylinder is free to move in the opposite direction independently of the piston.

The levers 21′ are tiltably disengaged from the piston by vibratory cranks 22 striking the other arms $21^2$ thereof and overcoming the unbalanced weight of said opposite hooked ends. The reciprocating movements of the compression cylinder are accomplished by rods 23 yieldingly connecting the cranks 22 with pins 15′ fixedly secured to the blocks 15. More specifically, the bearing boxes 24 for said pins are slidably mounted upon extensions 23′ of the rods with intervening springs 25 tending to force the boxes against the enlarged extremities $23^2$ of such extremities. The office of these springs is to resiliently maintain the cylinder in contact with the head end of the frame during the terminal portion of that movement of the cranks which effects the forward movements of the cylinder as well as the disengagement of the hook 21 and thus retaining the cylinder in such closed condition until the cylinder is retracted by an opposite swinging movement of the cranks through the rocking motion of the shaft 22′.

Adjacent to the head end the cylinder is provided with a casing 26 having therein a cylindrical chamber communicating by ports 26′ and $26^2$, respectively, with the interior of the compression cylinder and with a charging spout, not shown. Rotatably seated within the casting 26 is a plug valve 27, or an equivalent device, arranged to open or obstruct the communication between the aforesaid ports. The valve has a stem $27^2$ extending outside of the casing and carries an arm 28 which is connected to the end of an operating rod 29 whose other end is supported by anti-friction rollers 30, journaled on the ends of axle 29′ carried by the rod, and constrained by the slots 31 of guide members 31′ which are fixedly connected to the frame end 11′ and extends rearwardly therefrom. Said slots are, at their forward portions, made to conform to arcs concentric to the shaft 22′ while at the rear they are desirably directed therefrom at a point where the rollers 30 should withdraw the lug $29^3$ out of range of travel of the dog *c* when the closing of the valve 27 has been consummated. The guides 31′ are extended rearwardly to furnish a track for the rollers when the compression cylinder is in motion.

From the underside of the rod 29 are two depending lugs $29^2$, $29^3$, spaced so as to be at a suitable distance apart longitudinally and in different planes transversely of the rod and provided for the respective engagement with dogs which will be hereinafter described.

32 is a transversely arranged shaft which, during the operation of the machine, is continuously rotated from some suitable motor and at a relatively slow speed, say for example, twelve rotations per minute. This shaft has the crank-arm 32′ which is operatively connected by a link 33 with an arm 34 of a carrier 35 which is loosely mounted upon the shaft 22′ and is continuously vibrated.

The carrier is desirably formed of ribs 35′ integrally uniting the hubs $35^2$ which are mounted upon the shaft, as aforesaid, and rectangularly shaped housing comprised respectively of transversely arranged inner and outer members $35^3$ and $35^4$, and end members $35^5$. Within the latter is journaled a transverse spindle 36 upon which is mounted a plurality of sector-shaped cams 37 severally adjusted to impart outward or inward movements, as the case may be, to the respective dogs and against the action of the springs 38 which are employed to give rapid protruding movements to the dogs when they are respectively released from the cams. Each of these dogs, see Figs. 5 and 8, is formed with a shank 39 having a centrally disposed slot 40 through which passes the cam spindle 36 and has its engaging end 41 and its tail-end 41′ respectively seated to make sliding fits within apertures 42 and 42′ of said transverse members of the carrier. The engagement between the several dogs and their actuating cams is had by providing upon the shank of each of the former a concavo convex projection 43 which is adapted to be wiped by the cams to effect rapid motions of the dogs when being encountered and thence be immovably held by the cams while the arc-portions thereof are in contact with the concave faces of said projections and finally releasing the same so that the dogs will quickly respond to the action of the springs to thrust them in position to engage the arms with which they coact. For a better understanding of the functions of the several said dogs they will be denominated as *a*, *b*, *c*, *d* and *e* in the following references thereto.

The shaft 22′ carries therewith an arm $44^a$, and has two arms $44^e$ and $44^d$ loosely mounted so as to be operated independently of the shaft, or vice versa. Each of the above named arms have at their extremities shoes 45 which are respectively formed with a recess 45′ disposed between lugs $45^2$ and $45^3$, of which the latter is provided with a sloping face $45^4$ to deflect an advancing protruding dog and enable the same to pass over and become engaged within the recess 45′ through the counter action of the respective springs.

The lugs $45^2$ are extended beyond the lugs $45^3$ in order that they may be engaged by the carrier-member $35^3$ for the return of the arms to their normal positions after being swept to the rearward by the dog-engaging lug $45^3$ of the respective arm.

It is apparent that the vibrating carrier will, through the action of the dogs, move the arms to one side or the other of the carrier's travel and should the dogs thereupon be disengaged from the arms, the carrier will continue such vibrating motion unaccompanied by the arms until they are coupled therewith through a reëngagement of the dogs. The engaging and releasing of said arms are variably obtainable as to time and sequence by proportioning the sizes of the cam-sectors and the relative angular adjustment of the cams upon the intermittently rotating spindle. Such motion is imparted to the spindle from the vibrations of the carrier and through the agency of the devices which are most clearly shown in Figs. 5 to 10, inclusive. Fixedly secured to said spindle and exteriorly of the carrier is a ratchet wheel 46 possessing two sets of teeth 46′ and $46^2$ arranged in two planes for respective engagement by pawls 47 and 47′, of which the former 47 is hooked and acts against the series of teeth 46′, and pawl 47′ is unprovided with a hook and acts against the series of teeth $46^2$. Said pawls are pivotally attached to a plate 48 slidably connected to the carrier by suitable guides, such as 48′. This plate is given outward and inward movements with respect to the carrier by a rod 49 connecting a pin $48^3$ upon said plate and a pin 50 which is held at various adjusted positions concentrically of the shaft 22′ by a collar 50′ secured by a bolt $50^2$ to one of the journal boxes $22^2$ of this shaft. By this arrangement, the plate 48 will be thrust outward with each rearward swing of the carrier and retracted through the opposite swing of the same. The teeth of each of the aforesaid series, see Fig. 7, are so placed circumferentially as to present each tooth of one series in alternate position with reference to each tooth of the opposite series, that is, when a tooth of one series is in operative contact with its pawl, a space between two consecutive teeth of the other series is abreast of its pawl, consequently an impulsive movement given wheel 46 by one pawl upon a tooth of its series is necessary to carry a tooth of the other series into position to be acted upon by its pawl.

To illustrate, the outward movement of the hooked pawl 47 rotates the wheel 46 one step, bringing a tooth of series $46^2$ into position where the inward movement of pawl 47′ causes the wheel to be rotated another step which, in turn, brings a tooth of series 46′ where the outward movement of the hooked pawl 47 can again act upon wheel 46, with a resultant intermittent rotary motion being transmitted through the driven wheel 46 to the spindle 36 upon which it is mounted.

The teeth of each series are also arranged upon the wheel in such relation that two teeth of each series will be disposed at a greater distance apart than the remainder which are spaced equally. And the long space, $46^4$ or $46^5$, in each series is so placed that they are coincidently presented to the respective pawls and thus arrest further rotary movements of the spindle, while the reciprocating movements of the pawls 47 and 47′ with the plate 48 is uninterrupted.

To resume the rotary movements of the spindle, the teeth of the ratchet wheel 46 must again be brought into position to be influenced by the pawls, and for the accomplishment of which I employ the following described devices. A pin $46^3$, see Figs. 7, 9, and 10, is carried by the ratchet wheel 46 and arranged to project into an annular groove 51 of a supplemental ratchet wheel 51′ which is adjustably secured, as by set screws 53, to a bushing 54 which is loosely mounted upon the spindle 36. A stop, or abutment, $51^2$ is provided within this groove for engagement with the pin $46^3$ and, when thus engaged, causes the wheel 46 to be moved with the wheel 51′ for turning the former from its inoperative condition into position to have its teeth successively acted upon by the aforesaid pawls to cause the spindle to be active for operating the parts dependent thereupon. A relatively slow step by step rotary motion is imparted to ratchet wheel 51′ by the shoulder 52′ of a pawl 52 which is pivotally attached to the plate 48; while a faster motion is transmitted to this wheel by the extremity $52^2$ of the pawl acting within the notch $51^3$ of a lug $51^4$ when the latter is revolved into position to be engaged thereby. The notched lug is accordingly arranged to be acted against by said pawl extremity when the abutment $51^2$ is in contact with the aforesaid pin $46^3$, whereby a means is provided for turning the ratchet wheel 46 into position to be engaged by the pawls 47 and 47′. The wheel 51′ which, with the said bushing, is free to rotate upon the spindle 36, is prevented from becoming accidentally turned out of the position in which it is set by providing a brake arm 55 to frictionally engage a flange $51^5$ of the wheel and pressed against the latter by a spring 55′. The bushing 54 is extended through the hub of the wheel 51′ into the groove 51 thereof and wherein it is provided with a radially directed finger 54′ which is adapted for engagement by the pin $46^3$ and be swept thereby until the pin occupies the position in which it is illustrated in Fig. 7.

The wheel 51′ is, as above mentioned, adjustable upon said bushing and, by coupling them in re-adjusted position, the finger 54′ is re-located at various predetermined distances from the abutment. When the finger 54′ is adjacent to the pin $46^3$ and upon that side of the pin toward which it travels, as indicated by the arrow in Fig. 10, it is evident that wheel 46 after being carried into operative position through said abutment acting against pin $46^3$, the pin is revolved by the rotating of spindle 36 but a short distance before coming into contact with the finger, which carries wheel 51′ during the balance of its travel or until the inoperative condition obtains; or, briefly, the more removed finger 54′ is from the pin $46^3$ the farther must said pin travel before overtaking the finger with a proportionate decrease in the distance the pin has to propel the finger.

Inasmuch as wheel 51′ makes an entire rotation between the positions whereat the impulse is delivered to it by pawl 52, the further the pin $46^3$ rotates wheel 51′, the shorter the travel remaining to be completed by the pawl 52 urging it onward by a succession of shoves delivered through the pawl-shoulder 52′ to the ratchet teeth of this wheel.

The motion transmitted to wheel 51′ by pawl 52 being comparatively slow relatively to the motion which is imparted to the wheel through pin $46^3$; the longer the effective travel assigned to pawl 52′, the longer the time between the impulses which cause the wheel 46 to be brought into operative condition, hence the farther the pin $46^3$ drives wheel 51′, the less will be the distance in which pawl 52 has to drive it and with shorter intervals of time between the successive rotations of the spindle. In other words, the relative speeds and durations of the irregular movements of the wheel 51′ are regulated by the position in which the finger 54′ is placed. To locate the finger for accomplishing such functions, I employ an indicator comprised of a pointer $54^2$ upon the outer end of the aforesaid bushing which registers with index marks (not shown in the drawings) inscribed on the face of the dial-plate $51^6$. Furthermore, said index marks are graduated to designate the time which will ensue between the rotations of the spindle, for example, assuming that the carrier is being vibrated at the rate of once every five seconds, then to have twenty-five seconds elapse between the successive rotations of the spindle, the pointer would be manipulated to register with the fifth mark from the initial one with a corresponding adjustment of the finger.

Figure 4:
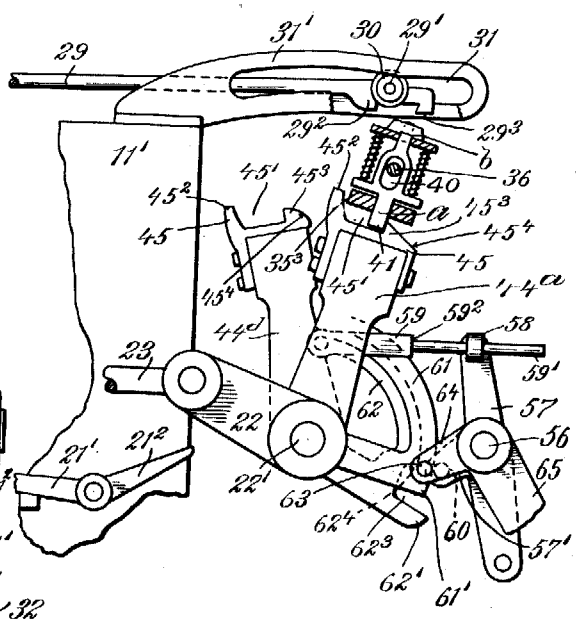

At a suitable distance to the rear of the shaft 22′, see Figs. 1 and 4, is another shaft 56 to which are secured, so as to oscillate therewith, arms 57, 57′, $57^2$. The arm 57 is provided with an apertured block 58 swiveled thereto and forming a sleeve for an extension 59′ of a bar 59 which is pivotally connected to the arm $44^d$ which, upon swinging rearwardly, impinges the shoulders $59^2$ of the bar against the block and accordingly rocks the shaft 56 to actuate an inlet valve 70 to open the same through the medium of a link 69 connecting the valve with the aforesaid arm $57^2$.

The arm 57′ is desirably bifurcated to furnish ample support for a pin 60 which is engaged by and acted upon to rock shaft 56 by the toe 61′ of a segmental off-set portion 61 of an arm $44^e$, which serves to close the water inlet valve during the early part of the sweep of the arm $44^e$, whereupon the pin slips from the toe but continues to bear against the curved face of the segmental portion of the arm throughout the continued rearward swing of the latter and also in its return swing. A similar segmental member 62 is secured to the shaft 22′ and is formed with a notch $62^3$ between a lug 62′ and a toe $62^4$ adjacent the end of the curved face of this member. The lug 62′ extends outside the arc-shaped peripheral face of the arm far enough to encounter the pin 63 on the return, or upward, swing of the arm 62. Pin 63 is securely held between arms 64 integral with a boss 64′ which is loose on shaft 56, and integrally to an arm 65 wherefrom the outlet valve 73 is operatively connected by means of a link 72. When arm $44^a$ is rocked by the carrier rearwardly segmental-arm 62 urges arm 65 therewith for opening the outlet valve; while during the latter portion of the return, forward, movement of the arm $44^a$, the lug 62′, engages pin 63 and forces arm 65 in the opposite direction for closing the valve. The space between the toe $62^4$ and lug 62′, see Fig. 4, and unoccupied by pin 63 affords lost motion to enable the arm $44^a$ to travel a short distance before disturbing the outlet valve. Furthermore, as the toe of segmental portion of arm $44^e$ bears upon its pin, with arms $44^a$ and $44^e$ coincidently engaged, the inlet valve can be closed before the outlet valve is opened.

In a recess of the frame end-member 11 is removably secured a circular face-plate $11^5$ perforated with small holes $11^4$, and on the outer side it is provided with vertically arranged grooves. In practice, a filter cloth, not shown in the drawings, is stretched over the inner face of the plate $11^5$ and is suitably fastened thereto. A similar face-plate $19^2$ is removably fastened to the end of the plunger 19′. In proximity of the bottom of and extending through both the end member 11 and the plunger 19 are apertures for the escape of the liquid which is exuded from the charge and after being filtered by the cloth.

After the charge has been pressed to forcibly exude the liquid components therefrom, the cylinder 16 is, through the action of aforedescribed mechanism, first retracted to allow the residual, or cake, to fall clear of the machine when the plunger 19′ has been withdrawn to release the same. However, should the cake, by adherence to one or the other of said face-plates, fail to drop of its own weight from the machine, it is forcibly dislodged by devices which are clearly illustrated in Figs. 1 and 2. These devices comprise an ejector 66 tiltably connected to brackets 67 upon end 11 of the machine-frame and is provided with horns 66′ adapted to be engaged by the lugs 68′ or collars $68^2$ formed or carried upon longitudinal bars 68 which are secured to and partake of the motion of the compressive-cylinder. The operation of such dislodging devices is directly attained by the collars $68^2$ encountering the horns 66′ to tilt the ejector so as to cause the bent end $62^2$ thereof to enter the space formed between the frame-end 11 and the retreating plunger and thus accomplishes the knocking out of the cake when required; while to withdraw the ejector, the lugs 68′ engage the horns upon the return of the compression cylinder.

One means for measuring the charge of material for the press is by inserting disks of different thickness between the piston and plunger which are accordingly made separable. When a selected disk is thus interposed between the plunger and piston the outer ends of the same are spaced farther apart, and consequently when the plunger is at its extreme rearward position a smaller space is afforded between this movable member and the end member 11 for the accommodation of a smaller quantity of material to be pressed and the production of a thinner cake.

It is to be noted that the farther apart the plunger and piston are placed the farther must the compression cylinder be carried before it encounters the opposing studs 20′ to withdraw the plunger from the cake. To compensate fo· such variations, that is, to prevent the ejector operating until the plunger has commenced its rearward movement, the collars $68^2$ would have to be correspondingly adjusted upon the bar 68.

The operation of the invention is as follows: Assuming that the pressing of a charge has been just completed, and the ratchet wheel 51′ is in position where lug $51^4$ is within the path traveled by the pawl 52. The rearward swing of the carrier 35 will then project this pawl against lug $51^4$ to start the rotation of spindle 36. During the opposite, or forward, swing of the carrier, dogs *a* and *e* are protruded to respectively engage arms $44^a$ and $44^e$. In the second rearward swing of the carrier, dog *b* is protruded to engage arm $44^b$, and arm $44^e$ operates to close the inlet valve, while arm $44^a$ rocks shaft 22′ to effect through its crank arms 22 and communicating rod 23 the rear movement of the cylinder 16. This cylinder, after being withdrawn from the machine-end 11 and beyond a previously pressed cake, engages the lugs 20 and continuing its movement to the rearward carries the plunger therewith. At the end of the rearward travel, the plunger is automatically locked through the engagement of its lugs 20 by the hooks 21.

During the first portion of the cylinder's travel, compression springs 25 are relieved, and the water outlet valve of the power cylinder is opened through the medium of the arms 62 and 65 together with the rod 72. The opening of this outlet valve is preferably done after the closing of the inlet valve, thereby lessening the pressure acting against the relatively large outlet valve and facilitating its movement. The inlet and outlet valves are respectively closed and opened during the time said compression springs are being relieved, but before any appreciable motion has been given to the compression cylinder so that the outlet valve will allow the liquid power medium acting against the plunger to escape, and the plunger being unobstructedly carried in its rearward travel.

During the second forward swing of the carrier, dogs *a* and *e* are disengaged from the arms $44^a$ and $44^e$, but which arms are swung with the carrier through its encountering their lugs $45^2$,—the arms $44^a$ serving to actuate the shaft 22′ to effect the forward movement of the compression cylinder to seat against the head $11^3$, the release of the plunger by the crank-arms 22 tilting the hooked levers 21′ from their locked engagement therewith, and also through the swinging of the segmental member 62, which is secured to the shaft, the outlet valve is closed; the dogs *c* and *d* are protruded; and the feed valve 27 is opened by the dog *b* acting against the lug $29^2$ of the valve rod 29.

In the third rearward swing of the carrier, dog *b* is retracted and the previously protruded dog *c* engages the lug $29^3$ of the rod 29 to close the feed valve 27; the dog *d* is engaged with the arm $44^4$ so that the water inlet valve is opened through rod 59 acting against the block 58 to swing the valve operating-arms 57′ and $57^2$. In the third forward swing of the carrier, dogs *c* and *d* are retracted. The next following rearward and forward swings of the carrier effect the continued rotation of the spindle 36 and the ratchet wheel 46 into position whereat the long spaces $46^4$ and $46^5$ thereof are presented to the actuating pawls 47 and 47′ and the latter being incapable of engaging this wheel, rotation of the spindle 36 ceases while the previously described supplementary devices cause the wheel 46 to be turned for reëngagement with the pawls for another cycle of operation such as I have just explained. While the pawls are in operation the pressing of the charge is in progress and is continued until the water inlet valve is closed, as before noted, after the recommencing of the spindle's rotation and in the afore designated second rear-swing of the carrier.

What I claim as my invention, and desire to secure by Letters-Patent, is:

1. The combination with the non-movable head of the frame and the movable cylinder coacting therewith, of a plunger arranged to act within said cylinder, means for reciprocating the cylinder to and from said head and acting also to move the plunger therewith in its movement from the head, and means for moving the plunger toward said head independently of the cylinder.

2. The combination of the non-movable head, the movable cylinder provided with a charging aperture, a valve for opening and closing said aperture, a plunger acting within the cylinder and in opposition to the head, means to effect the movements of said cylinder, means for operating said valve, and means for operating said plunger.

3. The combination with the frame having a stationary head, a movable cylinder coöperating with the head, a plunger movable in the cylinder, means to actuate said plunger, means to accomplish the movements of the cylinder with respect to the head, an ejector, and means operative during the movement of the cylinder for actuating the ejector.

4. The combination of the non-movable head, the movable cylinder provided with a charging aperture, a valve for opening and closing said aperture, a plunger acting within the cylinder in opposition to the head, means to effect the movements of said cylinder, means for operating said valve, means for operating said plunger, and means for adjustably regulating the actions of each of the aforesaid means.

5. The combination with the compression cylinder, a head therefor, a plunger acting within the cylinder, means for operating the plunger to effect the compression of material introduced between said head and the plunger, of devices for regulating the application of a power medium to operate the plunger, an ejector, and means operating during the movement of the cylinder for actuating the ejector.

6. The combination with the non-movable head, the movable cylinder provided with the charging aperture, a valve for opening and closing said aperture, a plunger acting within the cylinder and in opposition to the head, means to effect the movements of said cylinder, means for operating said valve, and means for operating said plunger, of a means adapted to adjustably regulate the actions of each of the aforesaid means, such last named means comprising a vibrating carrier, spring-pressed dogs upon the carrier and adapted to engage with devices which are operatively connected with the respective means, and devices which are actuated by the vibratory movements of said carrier whereby the several dogs are disengaged from the first named devices to render the same inoperative.

7. In a press, the combination with the frame having a fixed head, and a cylinder adapted to reciprocate in the frame and coact with the fixed head thereof, said cylinder being provided with an aperture through which the material to be pressed is admitted into the cylinder, a plunger for the cylinder, power means for effecting forward movements to the plunger, means for imparting forward and return movements to said cylinder and serving also to effect the return of the plunger with the cylinder, a valve for controlling the opening and closing of said aperture of the cylinder, and power actuated means for adjustably controlling the operating of the means for accomplishing the aforesaid movements of the cylinder and the plunger and likewise the operations of said valve.

8. The combination of the frame having a non-movable head, a cylinder slidably mounted in the frame, a plunger acting within the cylinder, means for effecting the movement of the cylinder to cause it to periodically bear against the head, means to admit a charge of material for treatment within the cylinder, means to effect the movement of the plunger for pressing the material, and means for successively retracting the cylinder and the plunger from the said head after the pressing of the material is accomplished.

9. The combination of the frame having a non-movable head, a cylinder slidably mounted in the frame, a plunger acting within the cylinder, means for effecting the movement of the cylinder to cause it to bear periodically against the head, means to admit a charge of material for treatment within the cylinder, means to effect the movement of the plunger for pressing the material, means for retracting the cylinder from said head after the pressing of the material is accomplished but prior to the retraction of the plunger, means for effecting such retraction of the plunger, and means operated by the retractile movement of the cylinder for ejecting the pressed material from between the head and the plunger.

10. The combination of the frame having a non-movable head, a power cylinder fixedly connected to the frame, a cylinder slidably mounted in the frame, a piston in said first named cylinder, a plunger acting within the second named cylinder, said piston and plunger being connected to act in unison, means for effecting the movement of the last-named cylinder to cause it to bear periodically against the head, means to admit a charge of material for treatment within the second named cylinder, means for introducing a fluid under pressure into the first named cylinder to effect the movement of the plunger for pressing the material, means for retracting the cylinder from said head after the pressing of the material is accomplished but prior to the retraction of the plunger, means for effecting such retraction of the plunger, and means operated by the retractile movement of the second named cylinder for ejecting the pressed material from between the head and the plunger.

11. In a press, the combination with a frame, a power cylinder at one end of the frame, and a fixed head at the other end of the frame, of a compression cylinder provided with a feed-aperture and arranged for reciprocation in said frame, a valve for said feed-aperture, a piston for said power cylinder, a plunger for the compression cylinder, said piston and plunger being formed or connected so as to operate as a single piece, devices upon the plunger adapted for engagement by the compression cylinder in the rearward travel of the latter, a rock-shaft, crank-arms upon the rock-shaft, connections between the crank-arms and the compression cylinder whereby the reciprocation of the latter is accomplished, a valve for controlling the admission of the power medium into said power cylinder, a valve to control the outflow of such power medium from this cylinder, a power shaft having a continuous rotary motion, operative connections between said power shaft and the rock shaft, operative connections between the power shaft and the several aforesaid valves, a carrier, connections between said power shaft and the carrier whereby a vibratory motion is imparted to the carrier, and adjustable devices upon said carrier and effected by the swinging of the latter whereby the connections between the power shaft and said rock-shaft and likewise those between the power shaft and the respective valves are made inoperative.

12. In a press, the combination with a frame, a power cylinder at one end of the frame, and a fixed head at the other end of the frame, of a compression cylinder provided with a feed-aperture and arranged for reciprocation in said frame, a valve for said feed-aperture, a piston for said power cylinder, a plunger for the compression cylinder, said piston and plunger being formed or connected so as to operate as a single piece, devices upon the plunger adapted for engagement by the compression cylinder in the rearward travel of the latter, means for locking the plunger against its return travel when it has reached the termination of said rearward travel, a rock-shaft, crank-arms upon the rock-shaft arranged to effect the disengagement of said locking means, connections between the crank-arms and the compression cylinder whereby the reciprocation of the latter is accomplished, springs included in said connections and adapted to yield during the terminal portion of the movements of the crank-arms for exerting a resilient pressure of the compression cylinder against said fixed head, a valve for controlling the admission of the power medium into said power cylinder, a valve to control the outflow of such power medium from this cylinder, a power shaft having a continuous rotary motion, operative connections between said power shaft and the rock-shaft, operative connections between the power shaft and the several aforesaid valves, a carrier, connections between said power shaft and the carrier whereby a vibratory motion imparted to the carrier, and adjustable devices upon said carrier and effected by the swinging of the latter whereby the connections between the power-shaft and said rock-shaft and likewise those between the power shaft and the respective valves, are made inoperative.

13. In a press, the combination with a frame, a power cylinder at one end of the frame, and a fixed head at the other end of the frame, of a compression cylinder provided with a feed-aperture and arranged for reciprocation in said frame, a valve for said feed-aperture, a piston for said power cylinder, a plunger for the compression cylinder, said piston and plunger being formed or connected so as to operate as a single piece, devices upon the plunger adapted for engagement by the compression cylinder in the rearward travel of the latter, means for locking the cylinder against its return travel when it has reached the termination of said rearward travel, a rock-shaft, crank arms upon the rock-shaft arranged to effect the disengagement of said locking means, connections between the crank-arms and the compression cylinder whereby the reciprocation of the latter is accomplished, a valve for controlling the admission of the power medium into said power cylinder, a valve to control the outflow of such power medium from this cylinder, a power shaft having a continuous rotary motion, operative connections between said power shaft and the rock-shaft, operative connections between the power shaft and the several aforesaid valves, a carrier, connections between said power shaft and the carrier whereby a vibratory motion is imparted to the carrier, and adjustable devices upon said carrier and effected by the swinging of the latter whereby the connections between the power-shaft and said rock-shaft and likewise those between the power-shaft and the respective valves are made inoperative.

14. In a press, the combination with a frame, a power cylinder at one end of the frame, and a fixed head at the other end of the frame, of a compression cylinder provided with a feed-aperture and arranged for reciprocation in said frame, a valve for said feed aperture, a piston for said power cylinder, a plunger for the compression cylinder, said piston and plunger being formed or connected so as to operate as a single piece, face plates for said plunger and fixed head, devices upon the plunger adapted for engagement by the compression cylinder in the rearward travel of the latter, means for locking the plunger against its return travel when it has reached the termination of said rearward travel, a rock-shaft, crank-arms upon the rock-shaft arranged to effect the disengagement of said locking means, connections between the crank-arms and the compression cylinder whereby the reciprocation of the latter is accomplished, a valve for controlling the admission of the power medium into said power cylinder, a valve to control the outflow of such power medium from this cylinder, a power shaft having a continuous rotary motion, operative connections between said power shaft and the rock-shaft, operative connections between the power shaft and the several aforesaid valves, a carrier, connections between said power shaft and the carrier whereby a vibratory motion is imparted to the carrier, and adjustable devices upon said carrier and effected by the swinging of the latter whereby the connections between said power shaft and said rock-shaft and likewise those between the power shaft and the respective valves are made inoperative.

15. In a press, the combination with a frame, a power cylinder at one end of the frame, and a fixed head at the other end of the frame, of a compression cylinder provided with a feed-aperture and arranged for reciprocation in said frame, a valve for said feed-aperture, a piston for said power cylinder, a plunger for the compression cylinder, said piston and plunger being formed or connected so as to operate as a single piece, devices upon the plunger adapted for engagement by the compression cylinder in the rearward travel of the latter, a rock-shaft, crank-arms upon the rock-shaft, connections between the crank-arms and the compression cylinder whereby the reciprocation of the latter is accomplished, springs included in said connections and adapted to yield during the terminal portion of the movements of the crank-arms for exerting a resilient pressure of the compression cylinder against said fixed head, a valve for controlling the admission of the power medium into said power cylinder, a valve to control the outflow of such power medium from this cylinder, a power shaft having a continuous rotary motion, operative connections between said power shaft and the rock-shaft, operative connections between the power shaft and the several aforesaid valves, a carrier, connections between said power shaft and the carrier whereby a vibratory motion is imparted to the carrier, and adjustable devices upon said carrier and effected by the swinging of the latter whereby the connections between the power shaft and said rock-shaft and likewise those between the power shaft and the respective valves are made inoperative.

16. In a press, the combination with a frame, a power cylinder at one end of the frame, and a fixed head at the other end of the frame, of a compression cylinder provided with a feed-aperture and arranged for reciprocation in said frame, a valve for said feed-aperture, a piston for said power cylinder, a plunger for the compression cylinder, said piston and plunger being formed or connected so as to operate as a single piece, devices upon the plunger adapted for engagement by the compression cylinder in the rearward travel of the latter, a rock-shaft, crank-arms upon the rock-shaft, connections between the crank-arms and the compression cylinder whereby the reciprocation of the latter is accomplished, an ejector, means operated by the reciprocation of the compression cylinder for actuating said ejector, a valve for controlling the admission of the power medium into said power cylinder, a valve to control the outflow of such power medium from this cylinder, a power shaft having a continuous rotary motion, operative connections between said power shaft and the rock-shaft, operative connections between the power shaft and the several aforesaid valves, a carrier, connections between said power shaft and the carrier whereby a vibratory motion is imparted to the carrier, and adjustable devices upon said carrier and effected by the swinging of the latter whereby the connections between the power shaft and said rock-shaft and likewise those between the power shaft and the respective valves are made inoperative.

17. In a press, the combination with a frame, a power cylinder at one end of the frame, and a fixed head at the other end of the frame, of a compression cylinder provided with a feed-aperture and arranged for reciprocation in said frame, a valve for said feed-aperture, a piston for said power cylinder, a plunger for the compression cylinder, said piston and plunger being formed or connected so as to operate as one piece, devices upon the plunger adapted for engagement by the compression cylinder in the rearward travel of the latter, means for locking the plunger against its return travel when it has reached the termination of said rearward travel, a rock-shaft, crank-arms upon the rock-shaft arranged to effect the disengagement of said locking means, connections between the crank-arms and the compression cylinder whereby the reciprocation of the latter is accomplished, an ejector, means operated by the reciprocation of the compression cylinder for actuating said ejector, a valve for controlling the admission of the power medium into said power cylinder, a valve to control the outflow of such power medium from this cylinder, a power shaft having a continuous rotary motion, operative connections between said power shaft and the rock-shaft, operative connections between the power shaft and the several aforesaid valves, a carrier, connections between said power shaft and the carrier whereby a vibratory motion is imparted to the carrier, and adjustable devices upon said carrier and effected by the swinging of the latter whereby the connections between said power shaft and said rock-shaft and likewise those between the power shaft and respective valves are made inoperative.

18. In a press, the combination with a frame, a power cylinder at one end of the frame, and a fixed head at the other end of the frame, of a compression cylinder provided with a feed-aperture and arranged for reciprocation in said frame, a valve for said feed-aperture, a piston for said power cylinder, a plunger for the compression cylinder, said piston and plunger being formed or connected so as to operate as a single piece, face plates for said plunger and fixed head, devices upon the plunger adapted for engagement by the compression cylinder in the rearward travel of the latter, means for locking the plunger against its return travel when it has reached the termination of said rearward travel, a rock-shaft, crank-arms upon the rock-shaft arranged to effect the disengagement of said locking means, connections between the crank-arms and the compression cylinder whereby the reciprocation of the latter is accomplished, springs included in said connections and adapted to yield during the terminal portion of the movements of the crank-arms for exerting a resilient pressure of the compression cylinder against said fixed head, an ejector, means operated by the reciprocation of the compression cylinder for actuating the ejector, a valve for controlling the admission of the power medium into said power cylinder, a valve to control the outflow of such power medium from this cylinder, a power shaft having a continuous rotary motion, operative connections between said power shaft and the rock-shaft, operative connections between the power shaft and the several aforesaid valves, a carrier, connections between said power shaft and the carrier whereby a vibratory motion is imparted to the carrier, and adjustable devices upon said carrier and effected by the swinging of the latter whereby the connections between the power shaft and the said rock-shaft and likewise those between the power shaft and the respective valves are made inoperative.

19. A press comprising a cylinder, means supporting the same for movement, means for compressing material in said cylinder including a plunger, means for reciprocating said cylinder to expose the material compressed by said last means, means for connecting said plunger with said cylinder for movement thereby after said material has been exposed, and means for moving said plunger in a reverse direction independently of said cylinder.

20. A press comprising a cylinder, a frame supporting said cylinder for movement, two coacting compressing members one of which is supported for sliding in said cylinder, means for reciprocating said cylinder to expose the compressed material, means whereby the movement of said cylinder is communicated to the last named of said compressing members to move the same away from the other of said members, and means for moving said last named compressing member toward the other independently of said cylinder.

21. The combination with the cylinder, the means for compressing the material therein, one of which is movable relatively to the other for exposing the compressed material, and means for operating the same, of an ejector supported for movement to and from a position exteriorly of said cylinder, and means for actuating said ejector to eject the compressed material.

22. The combination with the cylinder and the means for compressing the material therein, one of which is movable relatively to the other for exposing the compressed material, and means for operating the same, of an ejector for the compressed material, and means for operating said ejector by and during movement of said last named means to eject the material laterally of the said cylinder when exposed from the latter.

23. A press comprising a cylinder supported for movement in the direction of its length, means for compressing the material in said cylinder, means to move said cylinder independently of said first means to expose the compressed material, an ejector for the compressed material, and means operative by and during movement of said cylinder for actuating said ejector.

24. In a press, in combination with the compressing member thereof, fluid actuated means for operating said compressing member in one direction, other means for operating said compressing member in the reverse direction, releasable means for holding said compressing member against movement controlled for operation by said last means, and mechanism controlling said compressing member operating means for alternate operation.

25. A press, fluid operative means associated therewith for effecting the pressing operation, and mechanism for automatically terminating such operation irrespectively of the pressure applied therein and resetting the press, said mechanism being adjustable for varying the pressure period.

26. A press, fluid operative means associated therewith for effecting the pressing operation, mechanism for automatically terminating such operation irrespectively of the pressure applied therein and resetting the press, said mechanism being adjustable for varying the pressure period, and means for resetting said fluid operative means by and during the resetting of said press.

27. In a fluid operative press, fluid controlling means, and mechanism for automatically operating said means intermittently irrespectively of the pressure applied in the press, adjustable to vary the period of intermission.

28. In a fluid operative press, fluid controlling means, a continuously operating drive means, an intermittently operative mechanism connected to said drive means for operating said fluid controlling means irrespectively of the pressure applied in the press, and a controlling means for said mechanism adjustable for varying the length of intermission between the movements thereof.

29. A timing mechanism comprising a reciprocatory carrier, a normally inactive ratchet mechanism carried thereby, a second ratchet mechanism for setting said first ratchet mechanism operated by movement of said carrier, and adjustable means operated by said first ratchet mechanism for advancing said second ratchet mechanism.

30. A timing mechanism comprising a normally inactive ratchet mechanism, a second ratchet mechanism, means for operating the same, and means operated by said second ratchet mechanism for advancing and setting said normally inactive ratchet mechanism.

31. A timing mechanism comprising a normally inactive ratchet mechanism, a second ratchet mechanism, means operated by said second ratchet mechanism for setting said normally inactive ratchet mechanism, and adjustable means operated by said normally inactive ratchet mechanism for advancing said second ratchet mechanism.

Signed at Seattle, Washington this 3rd day of August 1909.

ELISHA HENRY ALVORD.

Witnesses:
ROGER HOVEY,
ALEX CURRIER.

Copies of this patent may be obtained for five cents each, by addressing the "Commissioner of Patents, Washington, D. C."

Correction in Reissue Letters Patent No. 13,351.

It is hereby certified that in Reissue Letters Patent No. 13,351, granted January 9, 1912, upon the application of Elisha Henry Alvord, of Seattle, Washington, for an improvement in "Automatic Filter-Presses," an error appears in the printed specification requiring correction as follows: In the heading, number of original patent, for "No. 894,966" read *No. 894,996;* and that the said Letters Patent should be read with this correction therein that the same may conform to the record of the case in the Patent Office.

Signed and sealed this 30th day of January, A. D., 1912.

[SEAL.]

C. C. BILLINGS,

*Acting Commissioner of Patents.*